(12) United States Patent
Pointner et al.

(10) Patent No.: US 12,146,559 B2
(45) Date of Patent: Nov. 19, 2024

(54) BENDING MESHING TYPE GEAR DEVICE

(71) Applicant: SUMITOMO HEAVY INDUSTRIES, LTD., Tokyo (JP)

(72) Inventors: Martin Pointner, Markt Indersdorf (DE); Sebastian Markert, Markt Indersdorf (DE); Kenji Shirouzu, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 21 days.

(21) Appl. No.: 17/949,853

(22) Filed: Sep. 21, 2022

(65) Prior Publication Data

US 2023/0008068 A1    Jan. 12, 2023

Related U.S. Application Data

(63) Continuation of application No. PCT/JP2021/010647, filed on Mar. 16, 2021.

(30) Foreign Application Priority Data

Mar. 24, 2020  (JP) ................................. 2020-052075

(51) Int. Cl.
| *F16H 49/00* | (2006.01) |
| *F16H 57/01* | (2012.01) |
| *G01L 5/00* | (2006.01) |

(52) U.S. Cl.
CPC .......... *F16H 49/001* (2013.01); *F16H 57/01* (2013.01); *G01L 5/0019* (2013.01);
(Continued)

(58) Field of Classification Search
CPC .......... F16H 1/32; F16H 49/001; F16H 57/01; F16H 57/08; F16H 2049/003;
(Continued)

(56) References Cited

U.S. PATENT DOCUMENTS

| 5,172,774 A | 12/1992 | Melrose |
| 6,962,088 B2 | 11/2005 | Horiuchi |

(Continued)

FOREIGN PATENT DOCUMENTS

| JP | H06-509164 A | 10/1994 |
| JP | H07-020537 U | 4/1995 |

(Continued)

OTHER PUBLICATIONS

Machine translation of JP 2004-198400 A obtained on Dec. 6, 2023.*

(Continued)

*Primary Examiner* — Adam D Rogers
(74) *Attorney, Agent, or Firm* — Michael Best & Friedrich LLP

(57) ABSTRACT

Provided is a bending meshing type gear device including a wave generator, an external gear flexibly deformed by the wave generator, and an internal gear meshing with the external gear. The internal gear includes an internal tooth ring portion including an internal tooth formed on an inner periphery, an external connection portion connected to an external member, an easily deformable portion provided between the internal tooth ring portion and the external connection portion, and configured to be more easily deformable than the internal tooth ring portion, and a distortion measurer provided in the easily deformable portion.

20 Claims, 11 Drawing Sheets

(52) U.S. Cl.
CPC .. *F16H 2049/003* (2013.01); *F16H 2057/012* (2013.01); *F16H 2057/016* (2013.01); *F16H 2057/018* (2013.01)

(58) Field of Classification Search
CPC ......... F16H 2055/176; F16H 2057/012; F16H 2057/016; F16H 2057/018; F16H 2057/085; G01L 5/0019
See application file for complete search history.

(56) References Cited

U.S. PATENT DOCUMENTS

| | | | | |
|---|---|---|---|---|
| 7,743,672 | B2* | 6/2010 | Kurtz | G01L 5/1627 73/862.041 |
| 8,291,775 | B2* | 10/2012 | Nagasaka | G01L 3/1457 73/862.041 |
| 10,989,276 | B2* | 4/2021 | Moritani | H02K 7/116 |
| 11,041,545 | B2* | 6/2021 | Yoshida | F16C 33/60 |
| 11,041,557 | B2 | 6/2021 | Koroyasu et al. | |
| 11,085,509 | B2* | 8/2021 | Shirouzu | F16H 55/17 |
| 11,088,589 | B2* | 8/2021 | Moritani | H02K 5/08 |
| 2019/0160654 | A1* | 5/2019 | Moritani | B25J 18/00 |
| 2019/0275681 | A1* | 9/2019 | Böhme | B25J 13/085 |
| 2021/0354348 | A1* | 11/2021 | Tamura | F16H 55/0833 |
| 2022/0034392 | A1* | 2/2022 | Damerau | F16H 49/001 |
| 2023/0036638 | A1* | 2/2023 | Okazaki | F16H 57/01 |

FOREIGN PATENT DOCUMENTS

| | | |
|---|---|---|
| JP | 2004-198400 A | 7/2004 |
| JP | 2007-040774 A | 2/2007 |
| JP | 2011-209099 A | 10/2011 |
| JP | 2018-132154 A | 8/2018 |
| JP | 2019-537032 A | 12/2019 |
| WO | WO-2010/142318 A1 | 12/2010 |

OTHER PUBLICATIONS

Search Report issued in European Application No. 21775014.0, dated Jun. 2, 2023.
International Search Report issued in Application No. PCT/JP2021/010647, mailed May 25, 2021.

* cited by examiner

BENDING MESHING TYPE GEAR DEVICE

RELATED APPLICATIONS

The contents of Japanese Patent Application No. 2020-052075, and of International Patent Application No. PCT/JP2021/010647, on the basis of each of which priority benefits are claimed in an accompanying application data sheet, are in their entirety incorporated herein by reference.

BACKGROUND

Technical Field

Certain embodiments of the present invention relate to a bending meshing type gear device.

Description of Related Art

In a gear device such as a bending meshing type gear device including an external gear which is flexibly deformed, a distortion gauge is attached to an outer periphery of a fixing frame of an internal gear, and a torque is detected from a detected distortion (for example, JP H07-20537, refer to the related art).

SUMMARY

According to an embodiment of the present invention, there is provided a bending meshing type gear device including a wave generator, an external gear flexibly deformed by the wave generator, and an internal gear meshing with the external gear. The internal gear includes an internal tooth ring portion including an internal tooth formed on an inner periphery, an external connection portion connected to an external member, an easily deformable portion provided between the internal tooth ring portion and the external connection portion, and configured to be more easily deformable than the internal tooth ring portion, and a distortion measurer provided in the easily deformable portion.

DETAILED DESCRIPTION

However, in the above-described gear device in the related art, since the distortion gauge is attached to the outer periphery of the fixing frame of the internal gear, the distortion gauge is located at a position where the distortion caused by the torque from the internal gear is unlikely to occur.

It is desirable to provide a bending meshing type gear device which enables satisfactory torque detection.

Hereinafter, embodiments of the present invention will be described in detail with reference to the drawings.

Embodiment 1

Figure 1:
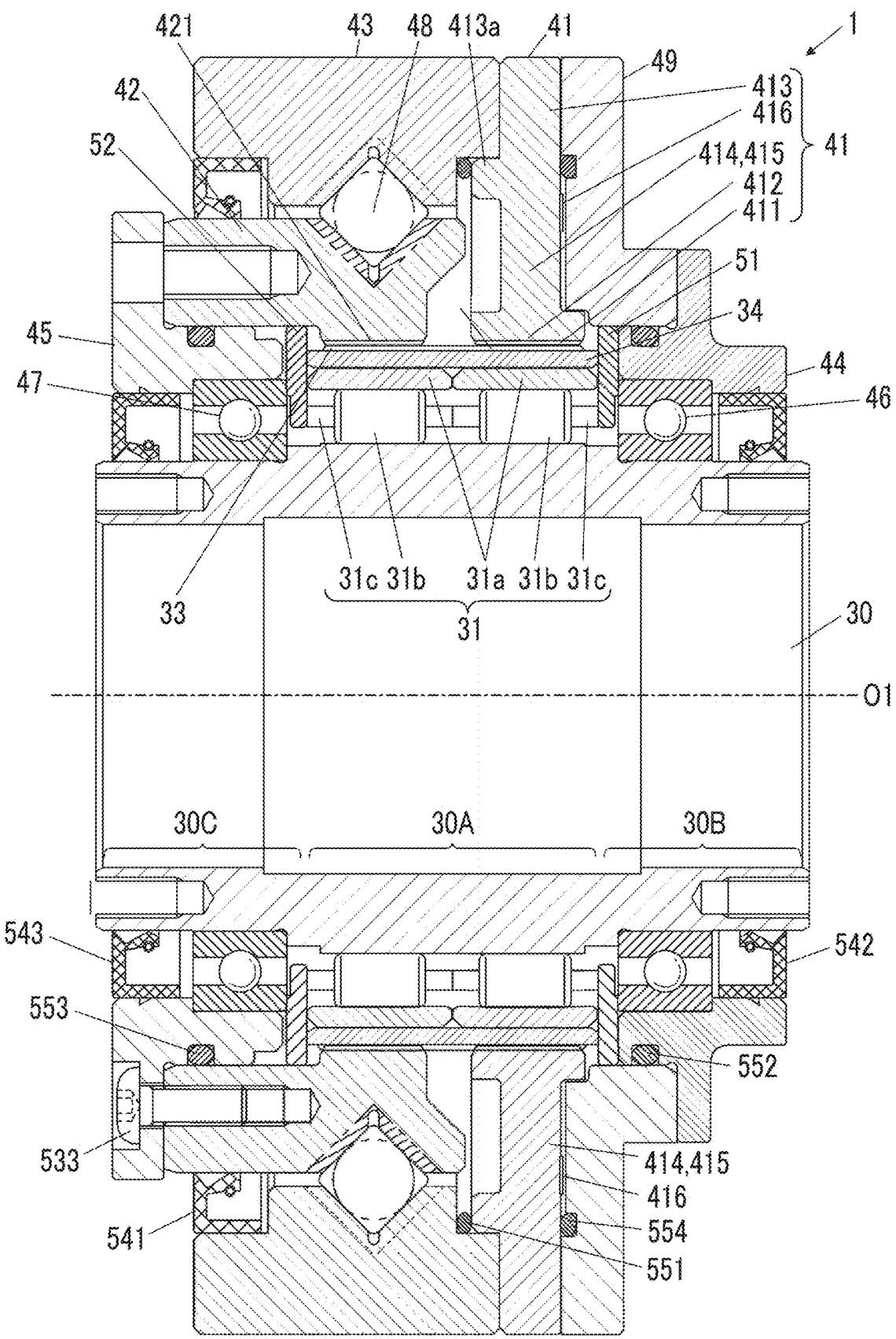
FIG. 1 is an axial sectional view illustrating a bending meshing type gear device according to Embodiment 1 of the present invention.

FIG. 1 is an axial sectional view illustrating a bending meshing type gear device 1 according to Embodiment 1 of the present invention.

In the following description, a direction parallel to a rotary axis O1 (to be described later) will be referred to as an axial direction, a direction along a circumference around the rotary axis O1 will be referred to as a circumferential direction, and a direction along a radius of the circumference around the rotary axis O1 will be referred to as a radial direction.

The bending meshing type gear device 1 according to Embodiment 1 is a speed reducer, for example. An application of the bending meshing type gear device 1 is not particularly limited, and various applications can be adopted. For example, the bending meshing type gear device 1 is used to drive a joint of a cooperative robot that carries out work in cooperation with a person. The bending meshing type gear device 1 includes a wave generator shaft 30, a wave generator bearing 31, a first external tooth portion 32, a second external tooth portion 33, a first internal tooth portion 411, a second internal tooth portion 421, a casing 43, a first cover 44, a second cover 45, a third cover 49, bearings 46 and 47, a main bearing 48, and stopper rings 51 and 52.

The wave generator shaft 30 is a hollow cylindrical shaft that rotates around the rotary axis O1, and includes a wave generator 30A having a non-circular (for example, elliptical) outer shape in a cross section perpendicular to the rotary axis O1, and shaft portions 30B and 30C provided on both sides in the axial direction of the wave generator 30A. The elliptical shape does not need to be a geometrically exact elliptical shape, and includes a substantially elliptical shape. The shaft portions 30B and 30C are shafts having a circular outer shape in the cross section perpendicular to the rotary axis O1. The wave generator shaft 30 may be a solid shaft.

The first internal tooth portion 411 is configured so that teeth are provided in a portion of an inner periphery of a first internal tooth member 41 serving as a stiff internal gear.

The second internal tooth portion 421 is configured so that teeth are provided in a portion of an inner periphery of a stiff second internal tooth member 42.

The first external tooth portion 32 and the second external tooth portion 33 are integrally provided so that one and the other are aligned in the axial direction in an outer periphery of one flexible metal cylindrical base portion 34. The first external tooth portion 32, the second external tooth portion 33, and the base portion 34 form an external gear.

The first external tooth portion 32 meshes with the first internal tooth portion 411, and the second external tooth portion 33 meshes with the second internal tooth portion 421.

For example, the wave generator bearing 31 is a roller bearing, and is disposed between the wave generator 30A and the base portion 34 in which the first external tooth portion 32 and the second external tooth portion 33 are formed. The wave generator 30A, the first external tooth portion 32, and the second external tooth portion 33 are relatively rotatable via the wave generator bearing 31.

The wave generator bearing 31 includes an outer ring 31a fitted into the base portion 34, a plurality of rolling elements (rollers) 31b, and a holder 31c for holding the plurality of rolling elements 31b.

The plurality of rolling elements 31b include a first group of the rolling elements 31b disposed inward in the radial direction of the first external tooth portion 32 and the first internal tooth portion 411 and aligned in the circumferential direction, and a second group of the rolling elements 31b disposed inward in the radial direction of the second external tooth portion 33 and the second internal tooth portion 421 and aligned in the circumferential direction. The rolling elements 31b roll on rolling surfaces by using an outer peripheral surface of the wave generator 30A and an inner peripheral surface of the outer ring 31a. The wave generator bearing 31 may have an inner ring separate from the wave generator 30A. In addition, the wave generator bearing 31 may not have the outer ring 31a, and an inner peripheral surface of the base portion 34 may be used as an outer ring-side rolling surface. A type of the rolling element is not particularly limited, and may be a ball, for example. In addition, the number of rows of the rolling elements is not limited to two. The number may be one row, or three or more rows.

The stopper rings 51 and 52 are disposed on both sides in the axial direction of the first external tooth portion 32, the second external tooth portion 33, and the wave generator bearing 31, thereby restricting a movement of the first external tooth portion 32, the second external tooth portion 33, and the wave generator bearing 31 in the axial direction.

The casing 43 covers an outer peripheral side of the second internal tooth member 42. An outer ring portion of the main bearing 48 is formed in an inner peripheral portion of the casing 43, and rotatably supports the second internal tooth member 42 via the main bearing 48. For example, the casing 43 is connected to the first internal tooth member 41 via a connection member such as a bolt.

For example, the main bearing 48 is a cross roller bearing, and includes a plurality of rolling elements disposed between an inner ring portion integrated with the second internal tooth member 42 and an outer ring portion integrated with the casing 43. The main bearing 48 may be configured to include a plurality of bearings (angular ball bearings or tapered bearings) separated in the axial direction between the second internal tooth member 42 and the casing 43.

In addition, an oil seal 541 is provided between the casing 43 and the second internal tooth member 42, on an output side of the main bearing 48, thereby suppressing an outflow of a lubricant flowing outward (to the output side) in the axial direction.

For example, the first cover 44 is connected to the third cover 49 via a connection member such as a bolt (not illustrated), and, for example, the third cover 49 is connected to the first internal tooth member 41 and the casing 43 via a connection member such as a bolt (not illustrated).

The first cover 44 covers the first external tooth portion 32 and the first internal tooth portion 411 from a counter-output side in the axial direction. The first cover 44, the third cover 49, the first internal tooth member 41, and the casing 43 are directly or indirectly connected to an external member (for example, a base end-side arm member of a cooperative robot).

For example, a side connected to the external member (also referred to as a mating member, for example, one member for transmitting power between main body devices in which the bending meshing type gear device 1 is incorporated as a component) to output a decelerated motion to the external member will be referred to as an output side. A side opposite to the output side in the axial direction will be referred to as a counter-output side. A bearing 46 is disposed between the first cover 44 and the shaft portion 30B of the wave generator shaft 30, and the wave generator shaft 30 is rotatably supported by the first cover 44. As the bearing 46, a ball bearing is used as an example. However, other radial bearings may be used.

An oil seal 542 is provided between the first cover 44 and the shaft portion 30B of the wave generator shaft 30, on the counter-output side of the bearing 46, thereby suppressing an outflow of the lubricant flowing outward (to the counter-output side) in the axial direction.

For example, the second cover 45 is connected to the second internal tooth member 42 via a connection member 533 such as a bolt, and covers the second external tooth portion 33 and the second internal tooth portion 421 from the output side in the axial direction. The second cover 45 and the second internal tooth member 42 are connected to an external member (for example, a tip side arm member of the cooperative robot) that outputs a decelerated motion (the external member is a member that relatively rotates with respect to an external member to which the first internal tooth member 41 is connected).

A bearing 47 is disposed between the second cover 45 and the shaft portion 30C of the wave generator shaft 30, and the wave generator shaft 30 is rotatably supported by the second cover 45. As the bearing 47, a ball bearing is used as an example. However, other radial bearings may be used.

An oil seal 543 is provided between the second cover 45 and the shaft portion 30C of the wave generator shaft 30, on the output side of the bearing 47, thereby suppressing an outflow of the lubricant flowing outward (to the output side) in the axial direction. The second cover 45 may be integrally formed with the second internal tooth member 42.

Furthermore, a sealing O-ring 551 is interposed between the first internal tooth member 41 and the casing 43.

Similarly, a sealing O-ring 554 is interposed between the first internal tooth member 41 and the third cover 49, a sealing O-ring 552 is interposed between the third cover 49 and the first cover 44, and a sealing O-ring 553 is interposed between the second internal tooth member 42 and the second cover 45.

Therefore, an internal space of the bending meshing type gear device 1 (space where a meshing portion between the first external tooth portion 32 and the first internal tooth portion 411, a meshing portion between the second external tooth portion 33 and the second internal tooth portion 421, the main bearing 48, the bearings 46 and 47, the wave generator bearing 31 are present) is a lubricant filling space to be filled with the lubricant, and is hermetically sealed with the oil seals 541 to 543 and the O-rings 551 to 554.

Figure 2:
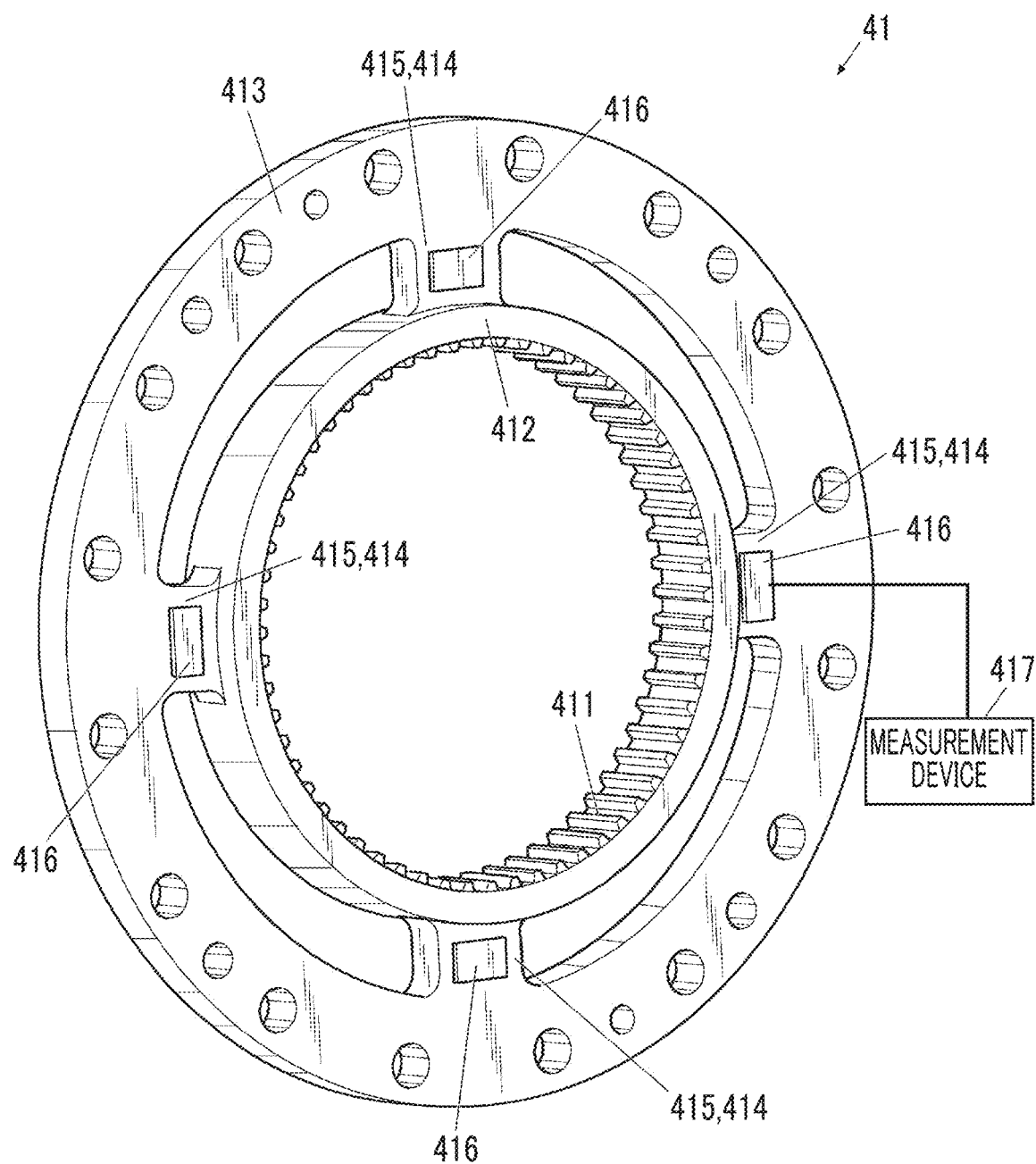
FIG. 2 is a perspective view of a first internal tooth member.

FIG. 2 is a perspective view of the first internal tooth member 41. As illustrated, the first internal tooth member 41 includes an internal tooth ring portion 412, an inner periphery of which has an internal tooth of the first internal tooth portion 411, an external connection portion 413 connected to an external member together with the casing 43 and the third cover 49, and an easily deformable portion 414 which is provided between the internal tooth ring portion 412 and the external connection portion 413 in the radial direction, and which is more easily deformable (which has a larger deformation amount) than the internal tooth ring portion 412 when a torque acts on the first internal tooth member 41.

The internal tooth ring portion 412 has a ring shape, and the first internal tooth portion 411 (internal tooth) is formed on an inner peripheral surface thereof.

The external connection portion 413 has a ring shape, and is located in the outermost periphery of the first internal tooth member 41. A plurality of attachment holes penetrating in the axial direction are formed for the external member at a constant interval in the circumferential direction. The external connection portion 413 may be directly connected to the external member, or may be connected to the external member via the first cover 44 or the third cover 49.

The easily deformable portion 414 is configured to include a plurality of pillar members 415 intermittently provided in the circumferential direction between the internal tooth ring portion 412 and the external connection portion 413.

The pillar member 415 extends outward in the radial direction from an outer periphery of the internal tooth ring portion 412, and is connected to an inner periphery of the external connection portion 413. Here, a case where the easily deformable portion 414, the internal tooth ring portion 412, and the external connection portion 413 are integrally formed of the same material (for example, a metal material or a resin material) will be described as an example.

In addition, a case where four pillar members 415 are provided at a constant interval in the circumferential direction will be described as an example. It is preferable that the interval between the respective pillar members 415 in the circumferential direction is uniform. However, this configuration is not essential. In addition, the number of the pillar members 415 can be increased or decreased.

The external connection portion 413 and the pillar member 415 have the same width (thickness) in the axial direction, and have a narrower axial width than that of the internal tooth ring portion 412. The pillar member 415 may have an axial width different from that of the external connection portion 413. For example, when intensity for ensuring a torque transmission function is sufficient, the pillar member 415 may have an axial width smaller than that of the external connection portion 413. In addition, the pillar member 415 may have a recessed portion for accommodating the distortion gauge 416.

A projection 413a projecting to the output side is formed over the entire circumferential direction on an output side flat surface inside the external connection portion 413 in the radial direction, and is fitted (spigot fitted) into a counter-output side recessed portion of the casing 43.

The distortion gauge 416 serving as a distortion measurer is attached to each of the pillar members 415. A case where the distortion gauge 416 is attached to a surface on the counter-output side in the pillar member 415 will be described as an example. However, the distortion gauge 416 may be attached to a surface on the output side, or may be attached to a surface on a side in one end portion or the other end portion in the circumferential direction.

As an example, a case will be described where the distortion gauge 416 is attached to the pillar member 415 in a direction in which expansion-contraction distortion of the pillar member 415 is detected in the radial direction. The direction in which the distortion is detected by the distortion gauge 416 is not limited to the radial direction.

The easily deformable portion 414 (pillar member 415) is more significantly deformed than the internal tooth ring portion 412, when a torque acts on the first internal tooth member 41 (specifically, in a state where the external connection portion 413 is connected to the external member, when the first internal tooth portion 411 receives a meshing reaction force so that a torque acts on the first internal tooth member 41). As a result, the expansion-contraction distortion in the radial direction which occurs in the pillar member 415 increases. The distortion of the pillar member 415 has a correlation with the torque. Accordingly, the torque can be acquired by causing the distortion gauge 416 to detect the distortion.

As illustrated in FIG. 2, each of the distortion gauges 416 is connected to the measurement device 417 (although FIG. 2 illustrates a state where only one distortion gauge 416 is connected, all of the distortion gauges 416 are actually connected).

The measurement device 417 amplifies and records a detection signal of each of the distortion gauges 416. In addition, in the measurement device 417, a rotation phase of the wave generator 30A is input from a detection unit (not illustrated).

For example, the measurement device 417 has a data table in which the rotation phase of the wave generator shaft 30 and a detection value and a torque value of each of the distortion gauges 416 are associated with each other. The measurement device 417 specifies the rotation phase input from the detection unit and the torque value corresponding to the detection value of each of the distortion gauges 416 with reference to the data table. For example, the data table is prepared in advance by an experiment. Specifically, the data table is prepared by acquiring the detection value of each of the distortion gauges 416 while changing the rotation phase of the wave generator 30A and the torque applied to the first internal tooth member 41. A method for causing the measurement device 417 to specify the torque from the detection value of each of the distortion gauges 416 is not particularly limited, and for example, a configuration may be adopted so that the torque value is calculated by calculating the torque value with a calculation expression prepared in advance.

Deceleration Operation

When a rotary motion is input from a motor (not illustrated) and the wave generator shaft 30 rotates, the motion of the wave generator 30A is transmitted to the first external tooth portion 32 and the second external tooth portion 33. In this case, the first external tooth portion 32 and the second external tooth portion 33 are restricted to a shape formed along an outer peripheral surface of the wave generator 30A, and are bent in an elliptical shape having a major axis portion and a minor axis portion when viewed in the axial direction. Furthermore, the first external tooth portion 32 meshes with the first internal tooth portion 411 of the fixed first internal tooth member 41 in the major axis portion. Therefore, the first external tooth portion 32 and the second external tooth portion 33 do not rotate at the same rotation speed as that of the wave generator 30A. The wave generator 30A relatively rotates inside the first external tooth portion 32 and the second external tooth portion 33. As a result of the relative rotation, the first external tooth portion 32 and the second external tooth portion 33 are flexibly deformed so that a major axis position and a minor axis position are moved in the circumferential direction. A period of the deformation is proportional to a rotation period of the wave generator shaft 30.

When the first external tooth portion 32 and the second external tooth portion 33 are flexibly deformed, the major axis positions are moved. In this manner, a meshing position between the first external tooth portion 32 and the first internal tooth portion 411 is changed in a rotation direction. Here, it is assumed that the number of teeth of the first external tooth portion 32 is set to 100 and the number of teeth of the first internal tooth portion 411 is set to 102. In this case, each time the meshing position rotates once, meshing teeth of the first external tooth portion 32 and the first internal tooth portion 411 are shifted from each other. In this manner, the first external tooth portion 32 rotates (revolves). When the number of teeth is set as described above, the rotary motion of the wave generator shaft 30 is decelerated at a reduction ratio of 100:2, and is transmitted to the first external tooth portion 32.

Meanwhile, the second external tooth portion 33 having the base portion 34 in common with the first external tooth portion 32 meshes with the second internal tooth portion 421. Accordingly, due to the rotation of the wave generator shaft 30, the meshing position between the second external tooth portion 33 and the second internal tooth portion 421 is also changed in the rotation direction. Meanwhile, the number of teeth of the second internal tooth portion 421 and the number of teeth of the second external tooth portion 33 coincide with each other. Accordingly, the second external tooth portion 33 and the second internal tooth portion 421 do not relatively rotate. The rotary motion of the second external tooth portion 33 is transmitted to the second internal tooth portion 421 at a reduction ratio of 1:1. For these reasons, the rotary motion of the wave generator shaft 30 is decelerated at a reduction ratio of 100:2, and is transmitted to the second internal tooth member 42 and the second cover 45. The decelerated rotary motion is output to the external member.

In the deceleration operation, in the first internal tooth portion 411, the torque is transmitted from the internal tooth ring portion 412 to the external connection portion 413 via the easily deformable portion 414.

In this case, in each of the pillar members 415 of the easily deformable portion 414, the radial distortion detected by the distortion gauge 416 provided in each of the pillar members 415 is input to the measurement device 417, and the torque value based on the distortion is derived.

For example, the torque value acquired by the configurations is input to a control device of the main body device in which the bending meshing type gear device 1 is incorporated as a component, and can be used to detect occurrence of an abnormality of the torque value in the control device. For example, when the bending meshing type gear device 1 is incorporated in a joint of a cooperative robot, the contact between a robot arm and a person is detected by using an abnormal increase in the torque value, and a stopping operation or an avoiding operation of the robot can be performed.

Technical Effect of Embodiment

As described above, according to the bending meshing type gear device 1 of the present embodiment, the first internal tooth member 41 includes the easily deformable portion 414 configured to be more easily deformable than the internal tooth ring portion 412, and the distortion gauge 416 provided in the easily deformable portion 414.

Therefore, when the torque is transmitted, the first internal tooth member 41 can detect the distortion in the easily deformable portion 414 which is more easily deformable than the internal tooth ring portion 412 inside the external connection portion 413. Therefore, the distortion gauge 416 can more accurately and satisfactorily detect the torque by detecting the distortion at a position where the distortion caused by the torque is likely to occur.

In addition, when the distortion is detected in the outer peripheral portion where the distortion caused by the torque is unlikely to occur, in order to improve detection accuracy, it is necessary to take measures for forming the first internal tooth member of a non-hard material as a whole so that the distortion caused by the torque is likely to occur in the outer peripheral portion. However, the measures have a disadvantage in that gear meshing errors are likely to occur.

In contrast, in the first internal tooth member 41 of the bending meshing type gear device 1 of the present embodiment, only a portion having the easily deformable portion 414 needs to be easily deformed. Therefore, occurrence of the gear meshing errors can be suppressed.

In addition, the distortion gauge 416 is installed inside the bending meshing type gear device 1 instead of the outer periphery of the bending meshing type gear device 1. Therefore, the device can be miniaturized.

In addition, the easily deformable portion 414 is configured to include the pillar members 415 intermittently provided in the circumferential direction between the internal tooth ring portion 412 and the external connection portion 413. Therefore, a special method for adding a new member is not required, and a configuration serving as the easily deformable portion 414 can be easily realized.

Embodiment 2

Figure 3:
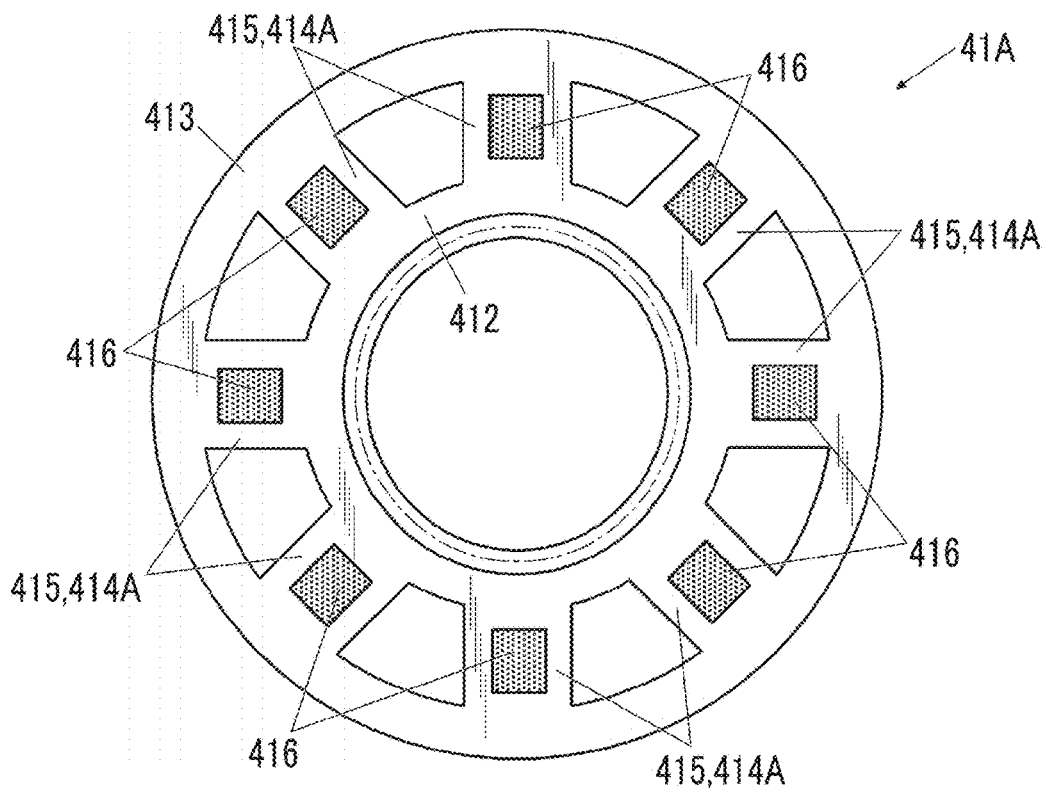
FIG. 3 is a front view when another example of a first internal tooth member of a bending meshing type gear device according to Embodiment 2 of the present invention is viewed in an axial direction.

FIG. 3 is a front view when another example of a first internal tooth member of a bending meshing type gear device according to Embodiment 2 of the present invention is viewed in the axial direction.

A first internal tooth member 41A of Embodiment 2 has a different number of the pillar members 415 forming an easily deformable portion 414A, compared to the above-described first internal tooth member 41. That is, the easily deformable portion 414A of the first internal tooth member 41A includes eight pillar member 415 provided at a uniform interval in the circumferential direction. A structure and dimensions of every pillar member 415 are the same as those of the pillar member 415 of the above-described first internal tooth member 41.

The distortion gauge 416 is individually attached to each of the pillar members 415.

In this way, in the first internal tooth member 41A, the internal tooth ring portion 412 can be supported from the outside by increasing the number of the pillar members 415, and bending of the internal tooth ring portion 412 can be suppressed. In this manner, the gear meshing errors can be reduced.

In addition, the number of the distortion gauges 416 can be increased.

Embodiment 3

Figure 4:
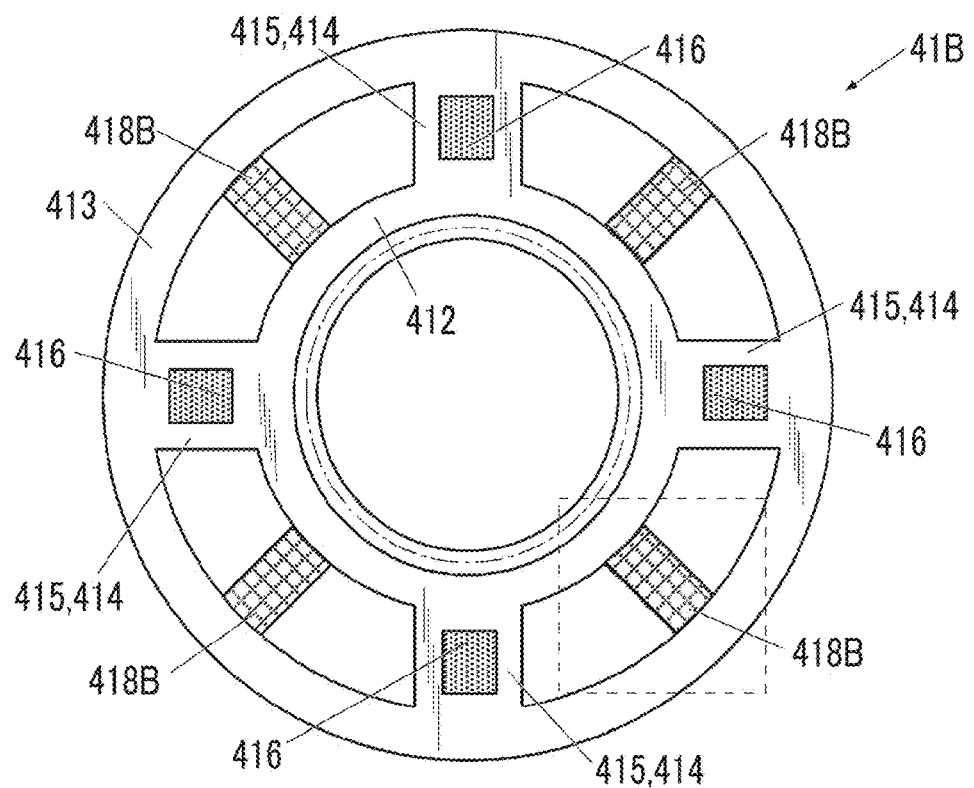
FIG. 4 is a front view when another example of a first internal tooth member of a bending meshing type gear device according to Embodiment 3 of the present invention is viewed in the axial direction.

FIG. 4 is a front view when another example of a first internal tooth member of a bending meshing type gear device according to Embodiment 3 of the present invention is viewed in the axial direction.

A first internal tooth member 41B of Embodiment 3 is different from the above-described first internal tooth member 41 in that the first internal tooth member 41B includes four support members 418B.

Each of the support members 418B is provided between the internal tooth ring portion 412 and the external connection portion 413 in the radial direction, and is provided between two pillar member 415 adjacent to each other in the circumferential direction.

Figure 5:
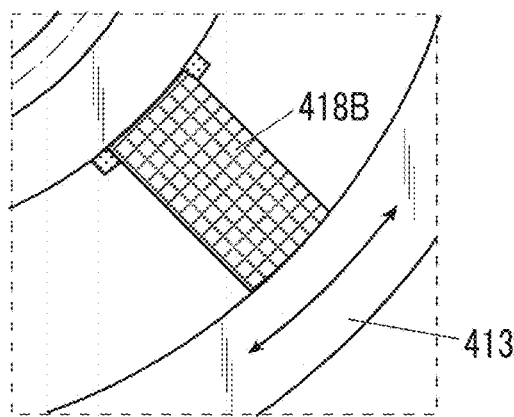
FIG. 5 is a partially enlarged front view illustrating a periphery of a support member of the first internal tooth member according to Embodiment 3.

As illustrated in FIG. 5, each of the support members 418B extends to bridge in the radial direction between the internal tooth ring portion 412 and the external connection portion 413. One end portion thereof, for example, the internal tooth ring portion 412 side is fixed, and the other end portion, for example, the external connection portion 413 side is in sliding contact with or slidable on the inner periphery of the external connection portion 413. The external connection portion 413 side may be fixed, and the internal tooth ring portion 412 side may be in sliding contact or slidable.

Each of the support members 418B is configured to include a member separate from the internal tooth ring portion 412 and the external connection portion 413, and one end portion side is fixed by welding, adhesion, or other joining methods. Each of the support members 418B may be fixed to the internal tooth ring portion 412 or the external connection portion 413 at least in the circumferential direction. In addition, each of the support members 418B may be formed of a material different from that of the first internal tooth member 41, such as a resin, or may be formed of the same material.

In this way, in the first internal tooth member 41B, the internal tooth ring portion 412 can be supported from the outside by providing the support member 418B, and bending of the internal tooth ring portion 412 can be suppressed. In this manner, the gear meshing errors can be reduced.

Furthermore, only one end portion side of the support member 418B is fixed to the external connection portion 413 or the internal tooth ring portion 412 in the circumferential direction, and the other end portion is not fixed. Therefore, while the internal tooth ring portion 412 is supported from the outside, the expansion-contraction distortion of the pillar member 415 caused by the torque is not suppressed. Therefore, the torque can be satisfactorily detected.

Embodiment 4

Figure 6:
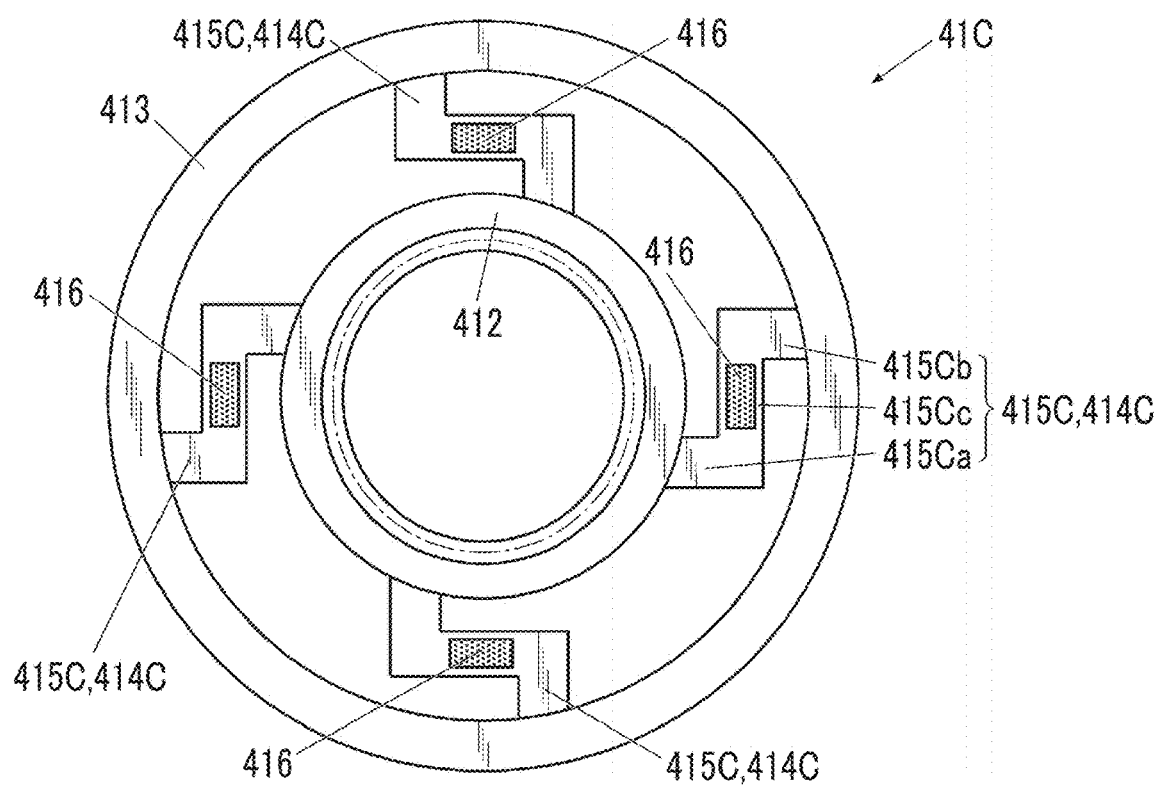
FIG. 6 is a front view when another example of a first internal tooth member of a bending meshing type gear device according to Embodiment 4 of the present invention is viewed in the axial direction.

FIG. 6 is a front view when another example of a first internal tooth member of a bending meshing type gear device according to Embodiment 4 of the present invention is viewed in the axial direction.

In the above-described first internal tooth member 41, the easily deformable portion 414 is configured to include the four pillar members 415 straightly extending in the radial direction. However, the present invention is not limited thereto.

A first internal tooth member 41C of Embodiment 4 includes a plurality of bearing portions 415C in which an easily deformable portion 414C connects the internal tooth ring portion 412 and the external connection portion 413 in the radial direction and the circumferential direction.

The plurality of bearing portions 415C are provided at a uniform interval in the circumferential direction between the internal tooth ring portion 412 and the external connection portion 413. Each of the bearing portions 415C may be integrally formed of a material the same as that of the internal tooth ring portion 412 and the external connection portion 413, or may be formed of a different material. In addition, both end portions of each of the bearing portions 415C are fixed to the internal tooth ring portion 412 and the external connection portion 413. In addition, here, a case where four bearing portions 415C are provided will be described as an example. However, the number may be two or more, and the number is not limited to four. In Embodiment 4, each of the bearing portions 415C corresponds to the pillar member.

Each of the bearing portions 415C has a crank shape. That is, each of the bearing portions 415C includes a first extending portion 415Ca extending outward in the radial direction from the outer periphery of the internal tooth ring portion 412, a second extending portion 415Cb extending inward in the radial direction from the inner periphery of the external connection portion 413, and an intermediate connection portion 415Cc connecting an extending end portion of the first extending portion 415Ca and an extending end portion of the second extending portion 415Cb and provided along the circumferential direction or a tangential direction with respect to the circumferential direction.

The distortion gauge 416 is attached in a direction in which the expansion-contraction distortion is detected in the longitudinal direction of the intermediate connection portion 415Cc, in the intermediate connection portion 415Cc of each of the bearing portions 415C.

In this way, in the first internal tooth member 41C, the distortion gauge 416 is provided in the intermediate connection portion 415Cc of the bearing portion 415C having the intermediate connection portion 415Cc which is a portion provided along the circumferential direction or the tangential direction with respect to the circumferential direction.

In this manner, when the torque is transmitted in the bending meshing type gear device, in the intermediate connection portion 415Cc which is a portion provided along the circumferential direction or the tangential direction with respect to the circumferential direction, the expansion-contraction distortion more significantly occurs. Therefore, the torque can be more accurately detected.

Embodiment 5

Figure 7:
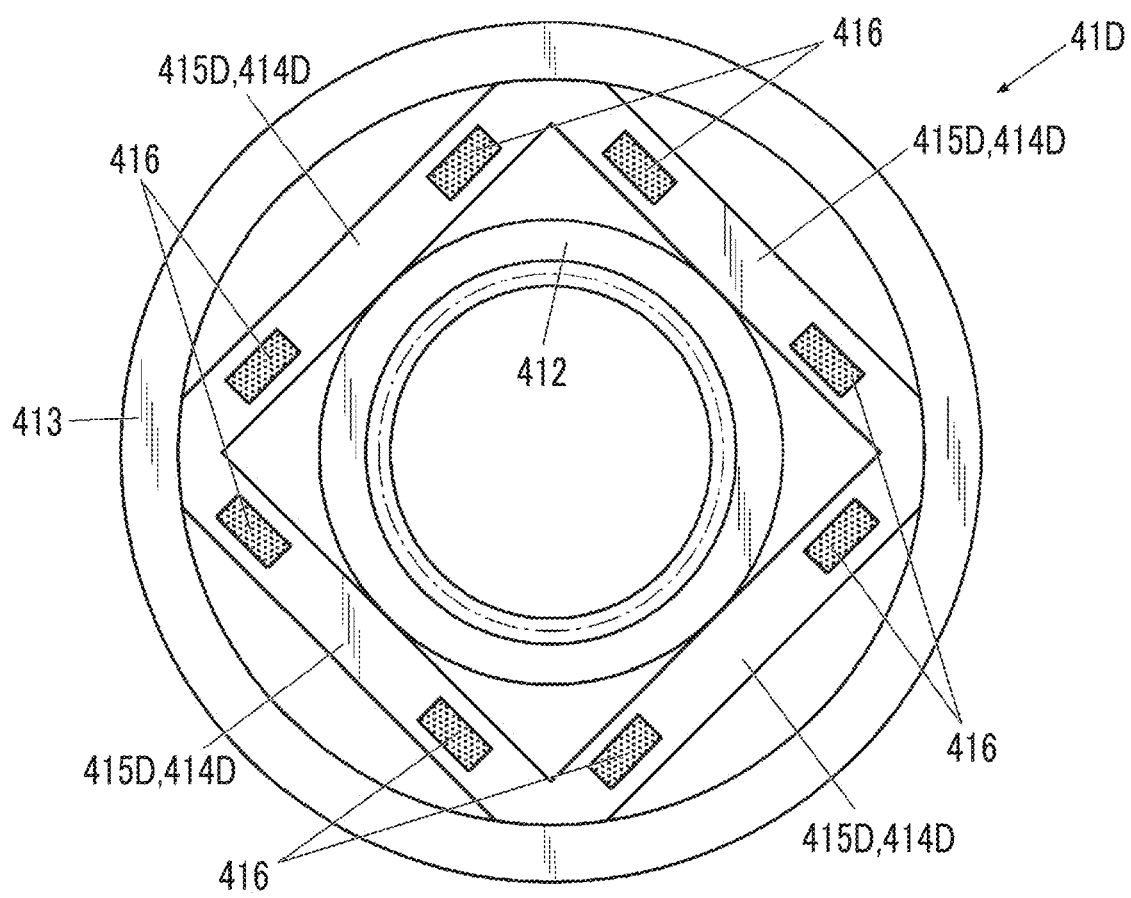
FIG. 7 is a front view when another example of a first internal tooth member of a bending meshing type gear device according to Embodiment 5 of the present invention is viewed in the axial direction.

FIG. 7 is a front view when another example of a first internal tooth member of a bending meshing type gear device according to Embodiment 5 of the present invention is viewed in the axial direction.

In the above-described first internal tooth member 41, the easily deformable portion 414 is configured to include the four pillar members 415 straightly extending in the radial direction. However, the present invention is not limited thereto.

A first internal tooth member 41D of Embodiment 5 includes a plurality of bearing portions 415D in which an easily deformable portion 414D is fixed to the outer periphery of the internal tooth ring portion 412 and extends in the tangential direction with respect to the circumferential direction.

Both end portions of each of the bearing portions 415D are fixed to the inner periphery of the external connection portion 413, and an intermediate portion thereof is fixed to the outer periphery of the internal tooth ring portion 412.

Here, a case where four bearing portions 415D are provided will be described as an example. Both end portions of the four bearing portions 415D are connected to end portions of the other bearing portions 415D, and the four bearing portions 415D are integrally formed to have a square frame shape when viewed in the axial direction.

Furthermore, in each of the bearing portions 415D, the distortion gauges 416 are attached one by one between each end portion fixed to the inner periphery of the external connection portion 413 and an intermediate portion fixed to the outer periphery of the internal tooth ring portion 412. Each of the distortion gauges 416 is attached in a direction in which the expansion-contraction distortion in the longitudinal direction of the bearing portion 415D is detected.

Each of the bearing portions 415D may be integrally formed of a material the same as that of the internal tooth ring portion 412 and the external connection portion 413, or may be formed of a different material.

In addition, here, a case where four bearing portions 415D are provided will be described as an example. However, the number is not limited to four as long as the internal tooth ring portions 412 can be surrounded at a uniform interval in the circumferential direction.

In this way, in the first internal tooth member 41D, the easily deformable portion 414D is configured to include the bearing portion 415D having the above-described structure. However, the easily deformable portion 414D can also more accurately and satisfactorily detect the torque, as in the easily deformable portion 414.

Embodiment 6

Figure 8:
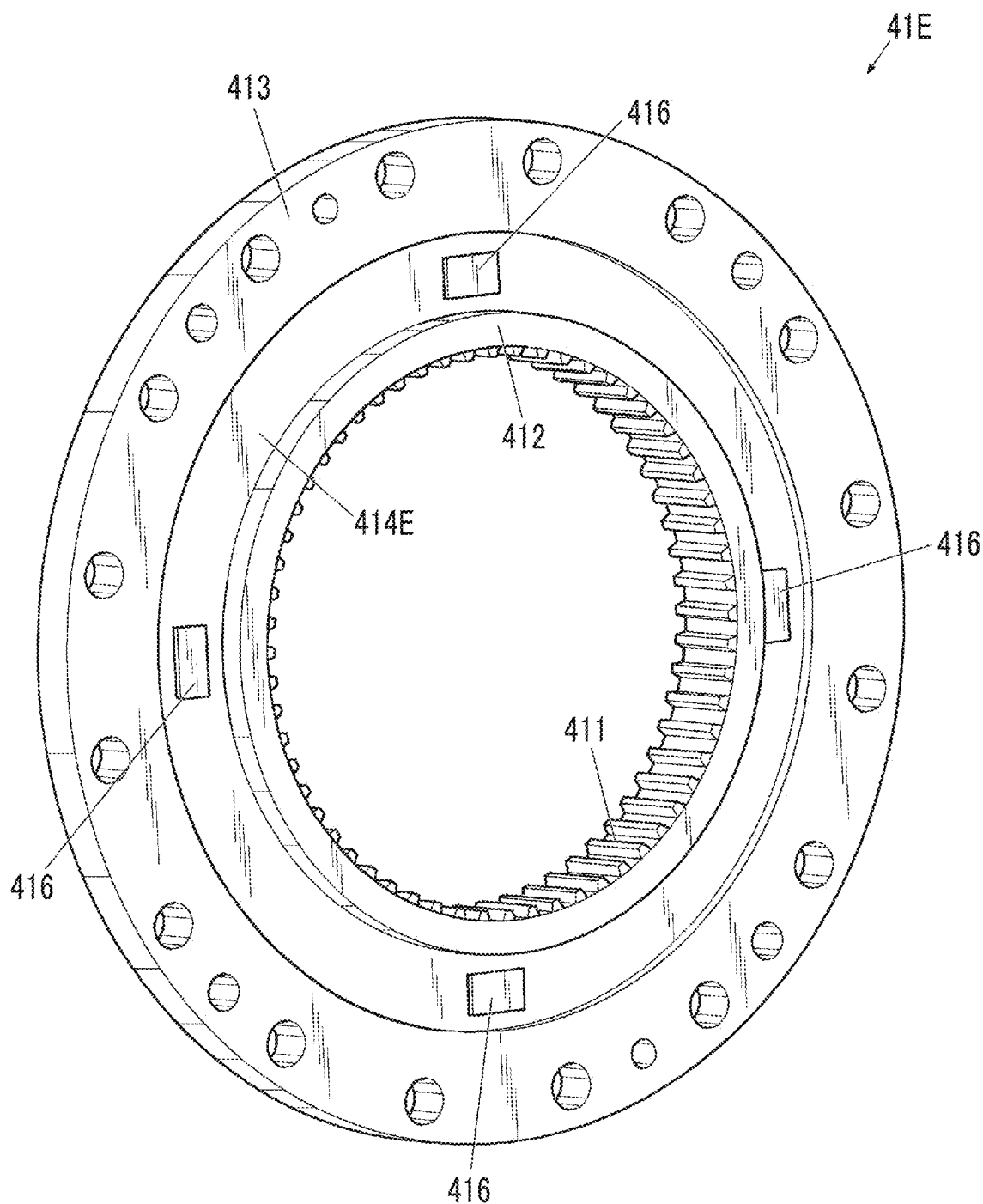
FIG. 8 is a perspective view illustrating another example of a first internal tooth member of a bending meshing type gear device according to Embodiment 6 of the present invention.

FIG. 8 is a perspective view illustrating another example of a first internal tooth member of a bending meshing type gear device according to Embodiment 6 of the present invention.

In the above-described first internal tooth member 41, the easily deformable portion 414 is configured to include the four pillar members 415 intermittently disposed in the circumferential direction. However, the configuration is not limited thereto.

In the first internal tooth member 41E of Embodiment 6, an easily deformable portion 414E is formed to have a ring-shaped flat plate which is continuous in the circumferential direction between the internal tooth ring portion 412 and the external connection portion 413.

Figure 9:
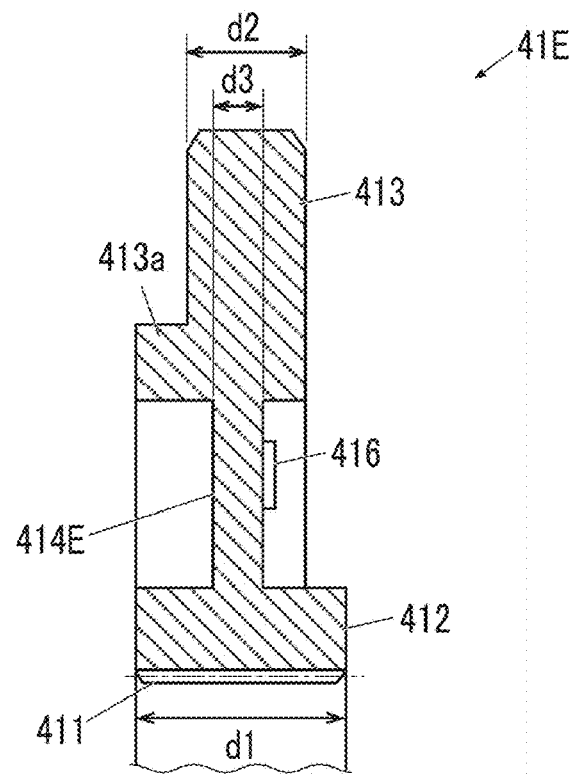
FIG. 9 is an axial sectional view of the first internal tooth member according to Embodiment 6 of the present invention.

However, as illustrated in the axial sectional view in FIG. 9, an axial thickness d3 of the easily deformable portion 414E is set to be smaller than any of an axial thickness d1 of the internal tooth ring portion 412 and an axial thickness d2 of the external connection portion 413.

The plurality of distortion gauges 416 are attached onto any flat surface of the easily deformable portion 414E at a uniform interval in the circumferential direction. Here, a case where the four distortion gauges 416 are provided will be described as an example. The number of the distortion gauges 416 may be one, and for example, a ring-shaped distortion gauge may be disposed along a ring shape of the easily deformable portion 414E.

Each of the distortion gauges 416 is attached in a direction in which the expansion-contraction distortion along the radial direction is detected.

In this way, in the first internal tooth member 41E, the easily deformable portion 414E has a flat plate shape which is continuous in the circumferential direction. The axial thickness d3 is set to be smaller than the axial thickness d1 of the internal tooth ring portion 412 and the axial thickness d2 of the external connection portion 413. Therefore, the easily deformable portion 414E is more likely to be deformed than the internal tooth ring portion 412 when the torque is transmitted in the bending meshing type gear device. As a result, the expansion-contraction distortion is likely to occur along the radial direction. As in the easily deformable portion 414, the easily deformable portion 414E can also more accurately and satisfactorily detect the torque. The axial thickness d3 of the easily deformable portion 414E may be smaller than at least the axial thickness d1 of the internal tooth ring portion 412, and may be equal to the axial thickness d2 or larger than the axial thickness d2 of the external connection portion 413. In addition, the easily deformable portion 414E is continuous in the circumferential direction. Therefore, the internal tooth ring portion 412 can be supported from the outside over the entire circumference, and bending of the internal tooth ring portion 412 can be suppressed. In this manner, the gear meshing errors can be reduced.

Embodiment 7

Figure 10:
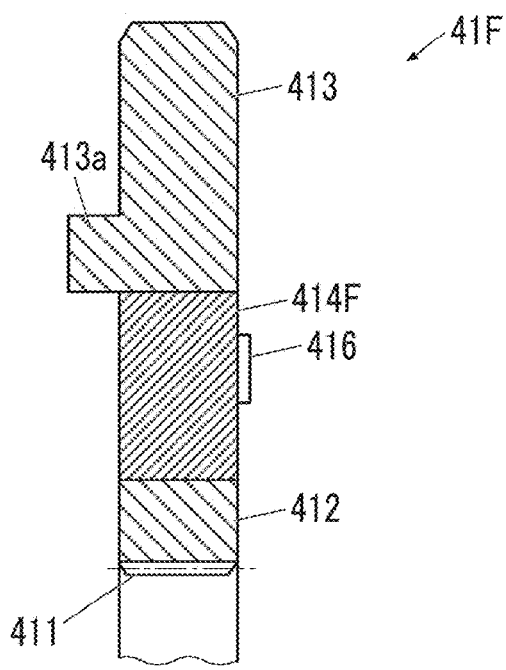
FIG. 10 is an axial sectional view of a first internal tooth member according to Embodiment 7 of the present invention.

FIG. 10 is an axial sectional view of a first internal tooth member according to Embodiment 7 of the present invention.

In each of the above-described embodiments, the shape of the easily deformable portion 414 is devised so that the easily deformable portion 414 is more easily deformable than the internal tooth ring portion 412. However, a method for making the easily deformable portion 414 easily deformable is not particularly limited. For example, as in the first internal tooth member 41F illustrated in FIG. 10, an easily deformable portion 414F may be more easily deformable than the internal tooth ring portion 412 by using a softer material than that of the internal tooth ring portion 412 and further that of the external connection portion 413. For example, it is preferable that the easily deformable portion 414F is formed of a metal material softer than that of the internal tooth ring portion 412 and the external connection portion 413, or a softer resin material.

In this case, the axial thicknesses of the internal tooth ring portion 412, the easily deformable portion 414F, and the external connection portion 413 may be the same as each other. Alternatively, the easily deformable portion 414F may be thicker than the internal tooth ring portion 412 or the external connection portion 413.

In addition, the easily deformable portions 414F may be intermittent, or may be continuous along the circumferential direction. When the easily deformable portions 414F are intermittent, the easily deformable portions 414F may have a form the same as that of the above-described easily deformable portions 414, 414A, 414C, and 414D. Furthermore, the above-described support member 418B may be added.

Embodiment 8

Figure 11:
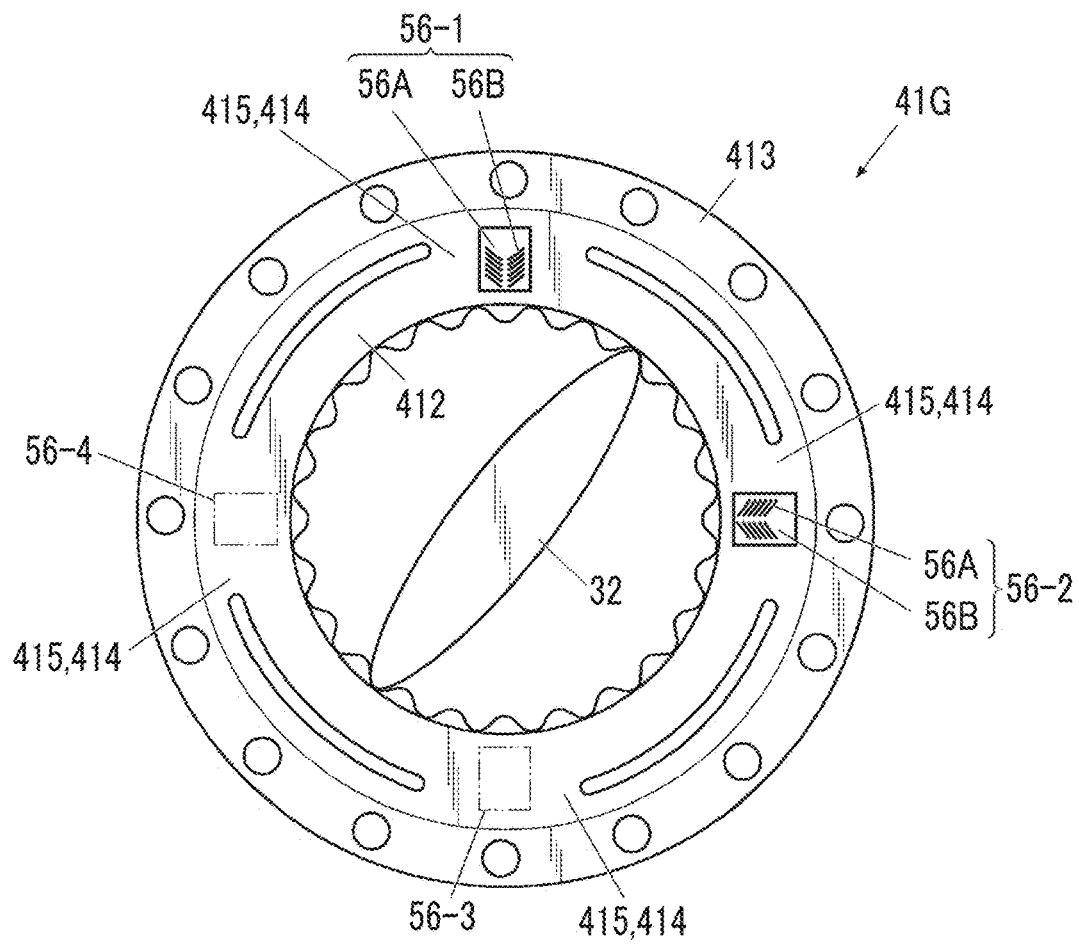
FIG. 11 is a front view of a first internal tooth member according to Embodiment 8 of the present invention.

FIG. 11 is a front view illustrating another example of a first internal tooth member of a bending meshing type gear device according to Embodiment 8 of the present invention. In FIG. 11, the first external tooth portion 32 is simply illustrated by an ellipse indicating the major axis position.

In the above-described first internal tooth member 41, the easily deformable portion 414 includes two sets, one set having two pillar members 415 individually provided on both sides of the first internal tooth member 41 in the radial direction. The four pillar members 415 configured to include the two sets are provided at a uniform interval in the circumferential direction, and the distortion gauges 416 are attached to all of the pillar members 415.

In contrast, in the bending meshing type gear device according to Embodiment 8, an easily deformable portion 414 of a first internal tooth member 41G is the same as the first internal tooth member 41 in the following points. The easily deformable portion 414 of the first internal tooth member 41G includes two sets, one set having two pillar members 415 provided on both sides of the first internal tooth member 41G in the radial direction. The respective pillar members 415 are provided at a uniform interval in the circumferential direction. In the first internal tooth member 41G, distortion gauges 56-1 and 56-2 are provided in only one set each having two pillar members 415.

The distortion gauge 56-1 and the distortion gauge 56-2 have the same structure. When both gauges do not need to be distinguished from each other in the following description, both gauges will be referred to as a distortion gauge 56.

In addition, distortion gauges 56-3 and 56-4 illustrated by a two-dot chain line in FIG. 11 are other examples of the first internal tooth member (to be described later), and the first internal tooth member 41G of Embodiment 8 is not provided with the distortion gauges 56-3 and 56-4.

Figure 12:
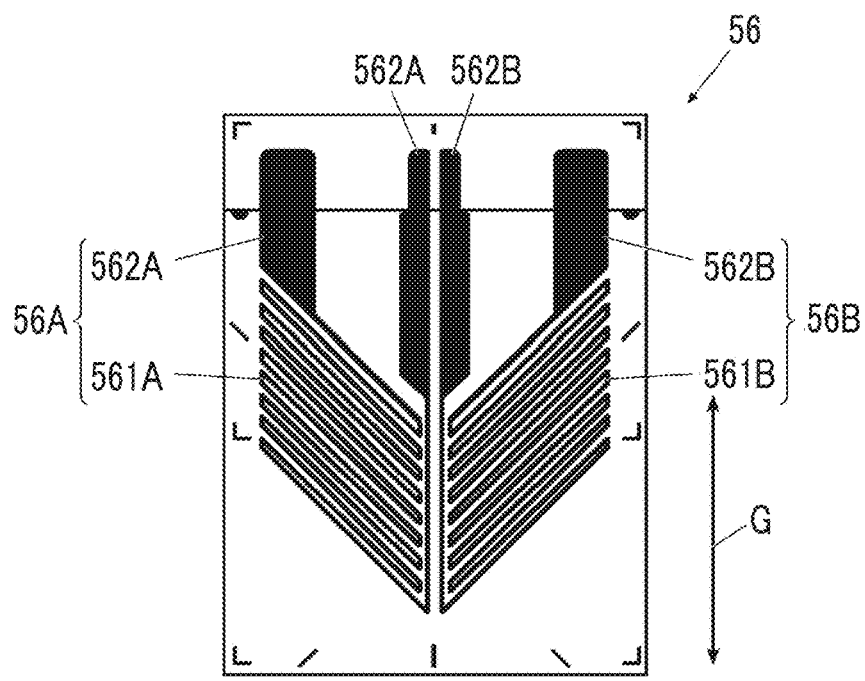
FIG. 12 is a plan view of a double shearing type distortion gauge.

FIG. 12 is a plan view of the distortion gauge 56. As illustrated in the drawing, the distortion gauge 56 is a double shearing type distortion gauge, and includes measurement units 56A and 56B individually formed on the left and right sides in FIG. 12 on a plane of an insulator substrate.

Each of the measurement units 56A and 56B includes grid portions 561A and 561B in which resistance wires are folded back in parallel in multiple layers, and leads 562A and 562B extending from both end portions of the grid portions 561A and 561B.

The resistance wire of the grid portion 561A of the measurement unit 56A on the left side in FIG. 12 extends obliquely rightward in a downward direction, and the resistance wire of the grid portion 561B of the measurement unit 56B on the right side extends obliquely leftward in the downward direction.

As can be understood from this structure, the distortion gauge 56 substantially includes two distortion gauges having different distortion detection directions, and has a structure which can individually obtain a detection signal from the two distortion gauges.

Each of the measurement units 56A and 56B has a structure which is highly sensitive to the contraction distortion in a direction along a wire extending direction of the respective grid portions 561A and 561B. The wire extending direction of the grid portion 561A of the measurement unit 56A and the wire extending direction of the grid portion 561B of the measurement unit 56B are perpendicular to each other.

In the distortion gauge 56, a direction in which the respective wire extending directions of the grid portions 561A and 561B of the two measurement units 56A and 56B are combined is set as a reference direction (arrow G in FIG. 12). The distortion gauge 56 is attached to the pillar member 415 so that a reference direction G is perpendicular to a direction in which a shearing force is generated with respect to the pillar member 415 during an operation of the bending meshing type gear device 1. More specifically, the reference direction G of the distortion gauge 56 is provided to be parallel to the longitudinal direction of the pillar member 415, that is, the radial direction.

In the above-described case, when the first external tooth portion 32 relatively rotates in a counterclockwise direction with respect to the first internal tooth member 41G due to rotation of the wave generator shaft 30 in a clockwise direction, (hereinafter, referred to as during forward rotation), the internal tooth ring portion 412 of the first internal tooth member 41G receives a torque in the clockwise direction with respect to the external connection portion 413. A shearing force generated by this operation mainly acts on the grid portion 561A of the measurement unit 56A, and a detection signal corresponding to the torque can be obtained from the measurement unit 56A.

In addition, when the first external tooth portion 32 relatively rotates in the clockwise direction with respect to the first internal tooth member 41G due to the rotation of the wave generator shaft 30 in the counterclockwise direction (hereinafter, referred to as during rearward rotation), the internal tooth ring portion 412 of the first internal tooth member 41G receives a torque in the counterclockwise direction with respect to the external connection portion 413. A shearing force generated by this operation mainly acts on the grid portion 561B of the measurement unit 56B, and a detection signal corresponding to the torque can be obtained from the measurement unit 56B.

The first internal tooth member 41G has a structure in which one end portion and the other end portion in the radial direction of the pillar members 415, one set having two pillar members 415, are symmetrical. In this case, when the bending meshing type gear device 1 is operated, as long as a bending moment in the axial direction is not generated, in both the one pillar member 415 and the other pillar member 415, one set having two pillar members 415, the shearing forces generated by the torque are equally generated.

Therefore, even when the distortion gauges 56 are not provided on both the pillar members 415, one set having two pillar members 415, when the distortion gauge 56 is provided on only one of the pillar members 415, a required distortion can be detected, and the torque can be obtained from detection of the respective distortion gauges 56.

That is, the bending meshing type gear device 1 of Embodiment 8 can particularly preferably obtain the torque when in use in an environment where the bending moment in the axial direction is unlikely to be generated.

Figure 13:
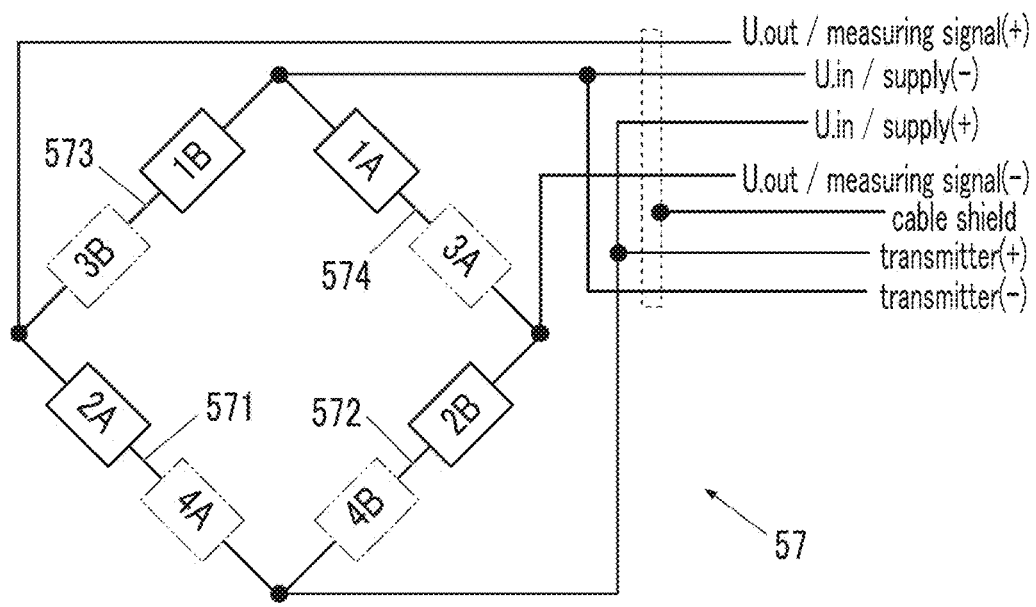
FIG. 13 illustrates a Wheatstone bridge circuit configured in a measurement device using a distortion gauge in FIG. 12.

FIG. 13 illustrates a Wheatstone bridge circuit 57 configured in a measurement device using each of the above-described distortion gauges 56.

The Wheatstone bridge circuit 57 includes first to fourth paths 571 to 574.

Both one end portion of the first path 571 and one end portion of the second path 572 are connected to a positive electrode side of a voltage supply source and a positive electrode side of a transmitter. In addition, both one end portion of the third path 573 and one end portion of the fourth path 574 are connected to a negative electrode side of the voltage supply source and a negative electrode side of the transmitter.

Furthermore, the other end portion of the first path 571 and the other end portion of the third path 573 are connected, and a connection point thereof serves a positive electrode side output of the detection signal. In addition, the other end portion of the second path 572 and the other end portion of the fourth path 574 are connected, and a connection point thereof serves as a negative electrode side output of the detection signal.

As illustrated in FIG. 13, the first path 571 is provided with the measurement unit 56A ("2A" in FIG. 13) of the distortion gauge 56-2, and the second path 572 is provided with the measurement unit 56B ("2B" in FIG. 13) of the distortion gauge 56-2. The third path 573 is provided with the measurement unit 56B ("1B" in FIG. 13) of the distortion gauge 56-1, and the fourth path 574 is provided with the measurement unit 56A ("1A" in FIG. 13) of the distortion gauge 56-1.

In a case of FIG. 13, "3A", "3B", "4A", and "4B" illustrated by a two-dot chain line indicate the respective measurement units 56A and 56B of the distortion gauges 56-3 and 56-4 in another example of the first internal tooth member (to be described later), and the Wheatstone bridge circuit 57 of Embodiment 8 is not provided with "3A", "3B", "4A", and "4B".

In the above-described Wheatstone bridge circuit 57, during the forward rotation of the first external tooth portion 32, the measurement unit 56A of the distortion gauge 56-1 and the measurement unit 56A of the distortion gauge 56-2 can respectively obtain a detection signal in accordance with the movement at the major axis position of the wave generator 30A. The detection signal is obtained from a potential difference between the positive electrode side output and the negative electrode side output of the Wheatstone bridge circuit 57. The detection signal based on a shearing distortion detected from the respective pillar members 415 correlates with the torque of the bending meshing type gear device. Therefore, the torque of the bending meshing type gear device can be obtained from the detection signal based on the shearing distortion.

As described above, in the bending meshing type gear device according to Embodiment 8, the number of the distortion gauges 56 can be reduced, compared to the number of the pillar member 415, and production costs of the device can be reduced.

In Embodiment 8, a case where the easily deformable portion 414 of the first internal tooth member 41G has two sets of (four) pillar members 415 has been described as an example. However, a configuration having one set or three or more sets of pillar members 415 may be adopted.

In addition, the double shearing type distortion gauge has been described as an example of the distortion gauge 56. However, it is also possible to use the distortion gauge 416 which detects the distortion in the longitudinal direction (radial direction) of the above-described pillar member 415.

In addition, it is also possible to use the distortion gauge 56 instead of the distortion gauge 416 in each of the above-described embodiments 1 to 7.

In addition, in Embodiment 8, the double shearing type distortion gauge has been described as an example. However, for example, when being in an environment in which the bending meshing type gear device is used only by either the forward rotation or the rearward rotation, the distortion gauge having only any one of the measurement units 56A and 56B may be used.

In addition, when the distortion gauges 56-1 to 56-4 are provided in all of the pillar members 415 as Embodiment 1, as illustrated by two-dot chain lines in FIGS. 11 and 13, the measurement unit 56A ("2A" in FIG. 13) of the distortion gauge 56-2 and the measurement unit 56A ("4A" in FIG. 13) of the distortion gauge 56-4 are provided in series in the first path 571 of the Wheatstone bridge circuit 57.

In addition, the measurement unit 56B ("2B" in FIG. 13) of the distortion gauge 56-2 and the measurement unit 56B ("4B" in FIG. 13) of the distortion gauge 56-4 are provided in series in the second path 572.

In addition, the measurement unit 56B ("1B" in FIG. 13) of the distortion gauge 56-1 and the measurement unit 56B ("3B" in FIG. 13) of the distortion gauge 56-3 are provided in series on the third path 573.

In addition, the measurement unit 56A ("1A" in FIG. 13) of the distortion gauge 56-1 and the measurement unit 56A ("3A" in FIG. 13) of the distortion gauge 56-3 are provided in series on the fourth path 574.

In this manner, it is possible to obtain the torque of the bending meshing type gear device from the detection signal based on the shearing distortion detected from the respective pillar members 415.

Embodiment 9

Figure 14:
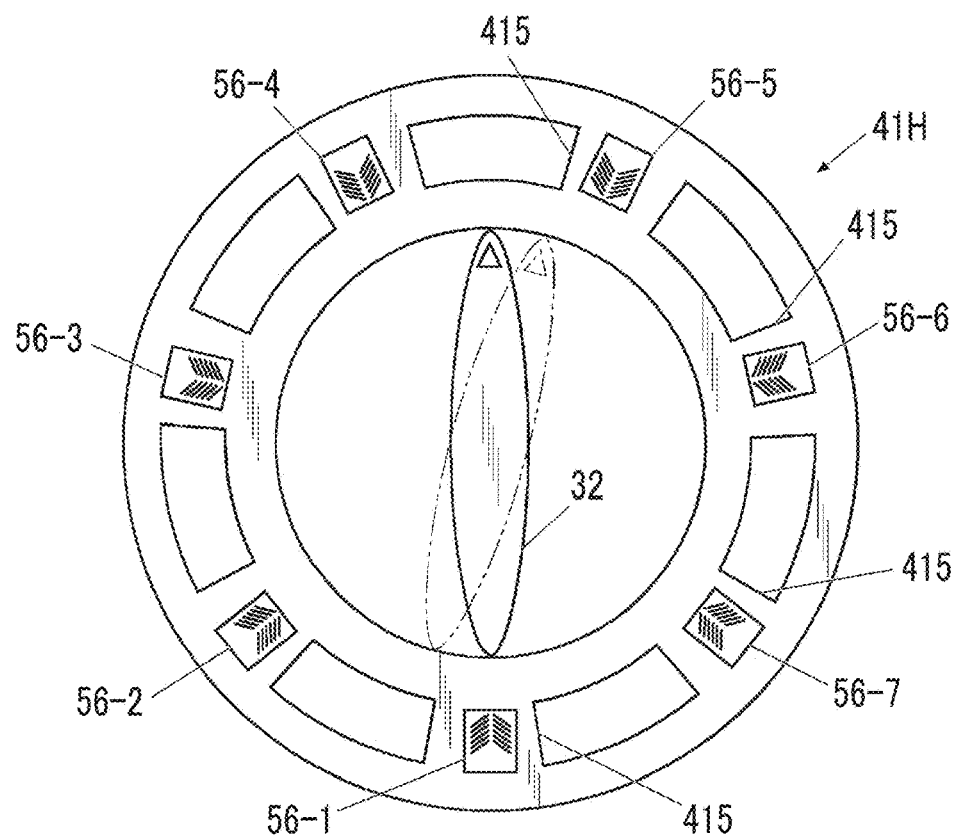
FIG. 14 is a simplified view illustrating another example of a first internal tooth member of a bending meshing type gear device according to Embodiment 9 of the present invention.

FIG. 14 is a simplified view illustrating another example of a first internal tooth member of a bending meshing type gear device according to Embodiment 9 of the present invention. In a case of FIG. 14, the first external tooth portion 32 is also simply illustrated by an ellipse indicating the major axis position.

In Embodiment 1 described above, the configuration in which the easily deformable portion 414 has an even number of the pillar members 415 provided at a uniform interval in the circumferential direction has been described as an example. In contrast, in a first internal tooth member 41H of the bending meshing type gear device according to Embodiment 9, a configuration in which a plurality of the easily deformable portions 414 and an odd number of the pillar members 415 are provided at a uniform interval in the circumferential direction will be described as an example. In Embodiment 9, a case where seven pillar members 415 are provided will be described as an example. However, the number of the pillar members 415 can be changed in any desired way as long as a plurality of the pillar members 415 and the odd number of the pillar members 415 are provided.

All of the pillar members 415 are provided with the distortion gauges 56-1 to 56-7 the same as the above-described distortion gauges 56 in order in the circumferential direction.

When the number of the pillar members 415 of the first internal tooth member 41H is the odd number, as illustrated by a solid line in FIG. 14, in a case of meshing at a position where one end portion of the major axis of the first external tooth portion 32 coincides with any of the pillar members 415 in the circumferential direction, the other end portion of the major axis of the first external tooth portion 32 meshes at an intermediate position between the other two pillar members 415.

In this case, on one end portion side of the major axis of the first external tooth portion 32, the shearing distortion occurring in the first internal tooth member 41H decreases due to stiffness of the pillar member 415, and the shearing distortion occurring in the first internal tooth member 41H increase on the other end portion side of the major axis of the first external tooth portion 32.

Here, among the distortion gauges 56-1 to 56-7, the distortion gauge which detects the distortion is mainly the distortion gauge located near the major axis of the first external tooth portion 32. In a case of the example illustrated by the solid line in FIG. 14, the distortion is detected by the distortion gauges 56-4, 56-5, 56-1, 56-2, and 56-7. However, the distortion gauges 56-2 and 56-7 are separated from the major axis. Therefore, the distortion is slightly detected. As described above, on the other end portion side of the major axis of the first external tooth portion 32, the shearing distortion occurring in the first internal tooth member 41H increases. Therefore, detection values of the distortion gauges 56-4 and 56-5 increase. On the other hand, on the one end portion side of the major axis of the first external tooth portion 32, the shearing distortion occurring in the first internal tooth member 41H decreases. Therefore, a detection value of the distortion gauge 56-1 decreases, compared to the distortion gauges 56-4 and 56-5. However, the measurement is performed through a Wheatstone bridge circuit 57H (refer to FIG. 15 to be described later) in which the respective measurement units 56A are connected in series and the respective measurement units 56B are connected in series. Therefore, detection signals are averaged in one end portion and the other end portion of the major axis of the first external tooth portion 32 (by summing up outputs of all of the distortion gauges), and an approximately medium detection signal is output.

In addition, as illustrated by a two-dot chain line in FIG. 14, in a case of meshing at a position where all of both end portions of the major axis of the first external tooth portion 32 do not coincide with the respective pillar members 415 or are close to the pillar member 415 in the circumferential direction, the shearing distortion occurring in the first internal tooth member 41H on both one end side and the other end side of the major axis of the first external tooth portion 32 is approximately medium.

Therefore, when the detection values of the respective distortion gauges 56-1 to 56-7 are summed up, the approximately medium detection signal is also output.

Therefore, the plurality of pillar members and the odd number of pillar members are provided. In this manner, a fluctuation range (of a total value or an average value) of the detection signals obtained from the respective distortion gauges 56-1 to 56-7 decreases when the major axis of the first external tooth portion 32 rotationally moves in the circumferential direction. To cope with this result, the Wheatstone bridge circuit 57H configured in the measurement device using the above-described respective distortion gauges 56-1 to 56-7 is configured as illustrated in FIG. 15.

Figure 15:
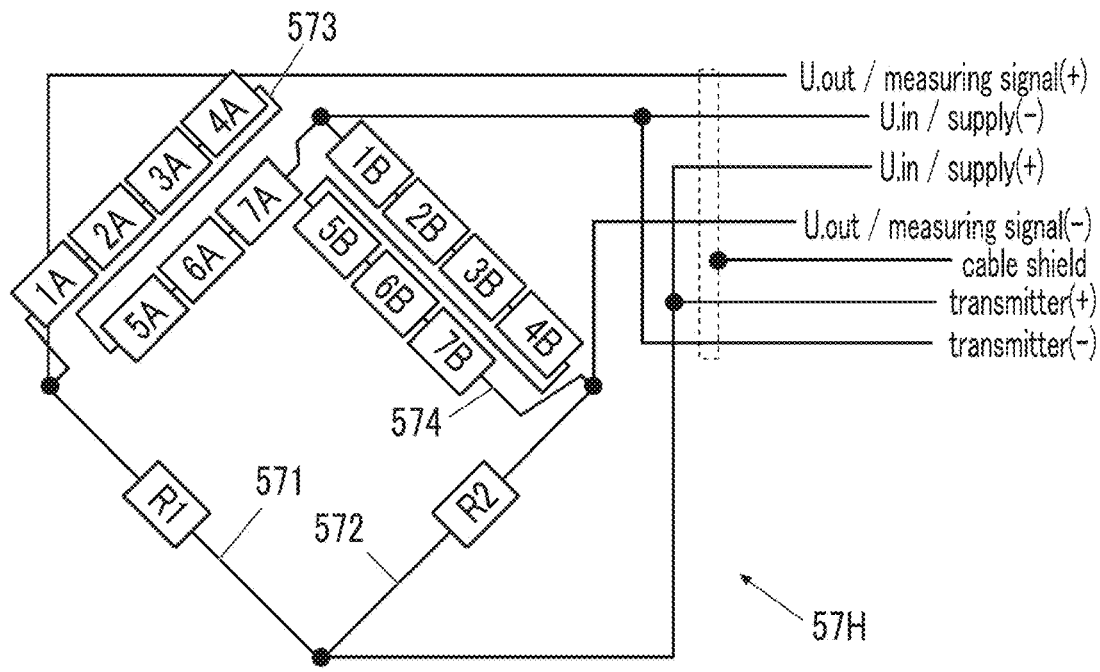
FIG. 15 illustrates a Wheatstone bridge circuit configured in a measurement device of the bending meshing type gear device in FIG. 14.

In FIG. 15, "1A" to "7A" respectively indicate the measurement units 56A of the distortion gauges 56-1 to 56-7, and "1B" to "7B" respectively indicate the measurement units 56B of the distortion gauges 56-1 to 56-7.

As illustrated in FIG. 15, a resistor R1 is provided in the first path 571, and a resistor R2 is provided in the second path 572. The respective measurement units 56A of the distortion gauges 56-1 to 56-7 are connected in series, and are provided in the third path 573. The respective measurement units 56B of the distortion gauges 56-1 to 56-7 are connected in series, and are provided in the fourth path 574.

The resistors R1 and R2 are equal to resistance values of the seven measurement units 56A connected in series when no distortion occurs (also equal to resistance values of the seven measurement units 56B connected in series).

In this way, in the Wheatstone bridge circuit 57H, the respective measurement units 56A or the respective measurement units 56B of the distortion gauges 56-1 to 56-7 are connected in series, and are disposed in any path of the four paths 571 to 574.

Therefore, when the major axis of the first external tooth portion 32 rotationally moves in the circumferential direction, even when an individual detection signal obtained from each of the distortion gauges 56-1 to 56-7 decreases, the respectively summed-up detection signal can be obtained, and the detection signal can be increased. In addition, since the plurality of pillar members and the odd number of pillar members are provided, it is possible to reduce variations in (the total value of) the detection signal caused by the position in the circumferential direction of the major axis of the first external tooth portion 32.

Figure 16:
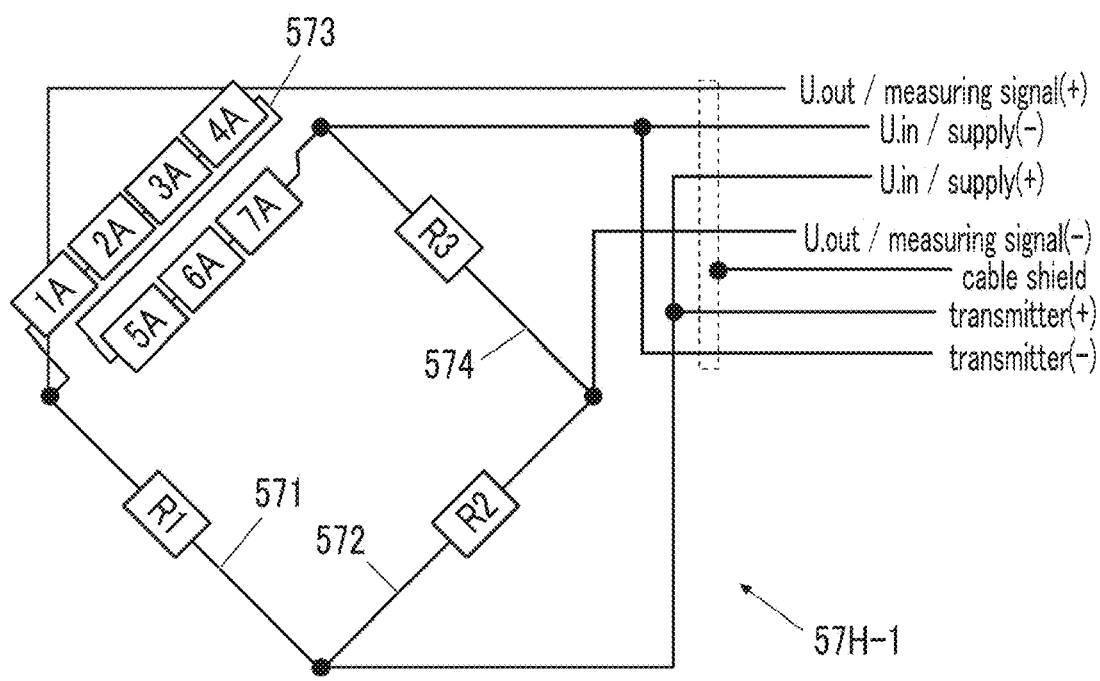
FIG. 16 illustrates one Wheatstone bridge circuit configured in another example of a measurement device of the bending meshing type gear device in FIG. 14.
Figure 17:
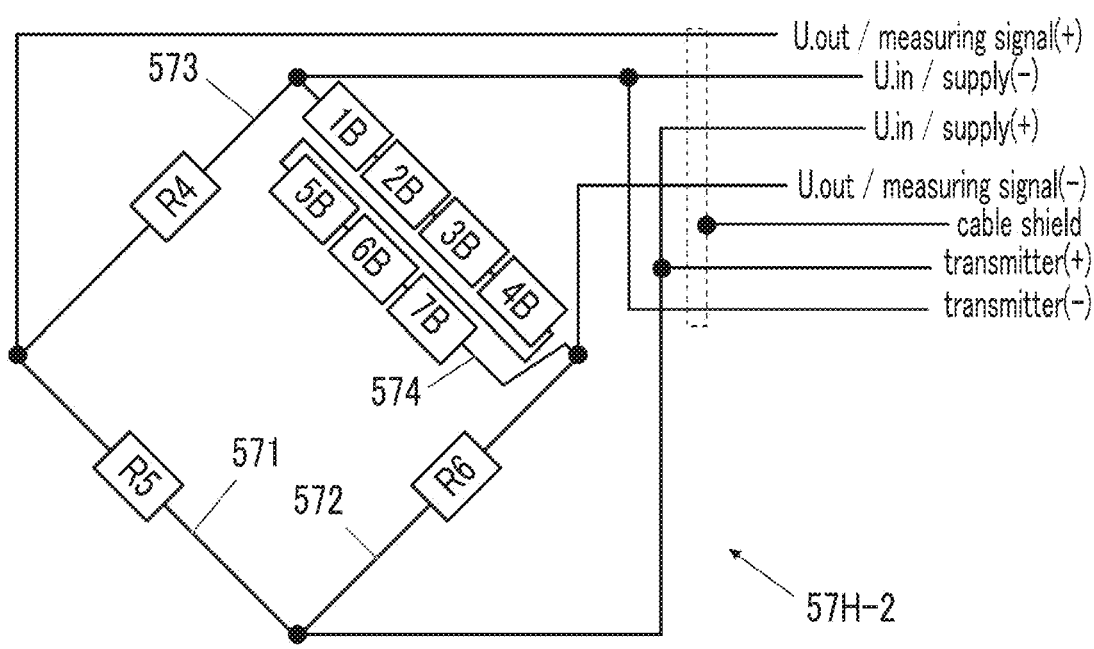
FIG. 17 illustrates the other Wheatstone bridge circuit configured in another example of a measurement device of the bending meshing type gear device in FIG. 14.

In addition, as the Wheatstone bridge circuit configured in the measurement device using the above-described respective distortion gauges 56-1 to 56-7, a configuration including two Wheatstone bridge circuits of a Wheatstone bridge circuit 57H-1 illustrated in FIG. 16 and a Wheatstone bridge circuit 57H-2 illustrated in FIG. 17 may be adopted.

As illustrated in FIG. 16, in the Wheatstone bridge circuit 57H-1, the resistor R1 is provided in the first path 571, and the resistor R2 is provided in the second path 572. The respective measurement units 56A of the distortion gauges 56-1 to 56-7 are connected in series, and are provided in the third path 573. A resistor R3 is provided in the fourth path 574.

The resistors R1 to R3 are equal to resistance values of the seven measurement units 56A connected in series when no distortion occurs (also equal to resistance values of the seven measurement units 56B connected in series).

In the Wheatstone bridge circuit 57H-2, as illustrated in FIG. 17, a resistor R5 is provided in the first path 571, a resistor R6 is provided in the second path 572, and a resistor R4 is provided in the third path 573. The respective measurement units 56B of the distortion gauges 56-1 to 56-7 are connected in series, and are provided in the fourth path 574.

The resistors R4 to R6 are equal to resistance values of the seven measurement units 56B connected in series when no distortion occurs.

In any case of the Wheatstone bridge circuits 57H-1 and 57H-2, one end portion of the first path 571 and the second path 572 is connected to the positive electrode side of the voltage supply source and the positive electrode side of the transmitter, and one end portion of the third path 573 and the fourth path 574 is connected to the negative electrode side of the voltage supply source and the negative electrode side of the transmitter. In addition, the other end portion of the first path 571 and the third path 573 is the positive electrode side output of the detection signal, and the other end portion of the second path 572 and the fourth path 574 is the negative electrode side output of the detection signal.

A voltage is supplied to all of the respective Wheatstone bridge circuits 57H-1 and 57H-2 from the same voltage supply source, and each of the Wheatstone bridge circuits 57H-1 and 57H-2 can obtain a different (independent) detection signal. According to this configuration, two comparable detection signals can be individually acquired from the respective Wheatstone bridge circuits 57H-1 and 57H-2 to carry out safety level diagnosis.

Other Configurations

Details in the above-described respective embodiments can be appropriately changed within the scope not departing from the concept of the invention.

In addition, in the above-described respective embodiments, a configuration in which the easily deformable portion and the distortion gauge are provided in the first internal tooth member has been described as an example. However, the easily deformable portion and the distortion gauge may be provided in the second internal tooth member. Even in this case, the configuration has to be adopted as follows. The second internal tooth member includes the internal tooth ring portion having the internal tooth formed on the inner periphery and the external connection portion connected to the external member, and the easily deformable portion and the distortion gauge are provided therebetween.

In addition, regardless of whether the easily deformable portion and the distortion gauge are provided in either the first internal tooth member or the second internal tooth member, any one of the first internal tooth member and the second internal tooth member may be located on a non-rotating side or on an upstream side in a power transmission direction. In addition, in Embodiments 1 to 9 described above (excluding Embodiment 8), the distortion gauges 416 and 56 are attached to all of the pillar members 415. However without being limited thereto, the distortion gauges 416 and 56 may be attached to only some of the pillar members 415. In addition, in the above-described embodiments, the distortion gauge 416 is disposed on an axial end surface of the pillar member 415. However, without being limited thereto, for example, the distortion gauge 416 may be disposed on a surface of the pillar member 415 in the circumferential direction.

In addition, in the above-described embodiments, a tubular meshing type gear device has been described as an example of the bending meshing type gear device 1. However, the present invention can also be preferably applied to a bending meshing type gear device other than the tubular type, for example, a bending meshing type gear device adopting a cup type or a silk hat type.

INDUSTRIAL AVAILABILITY

The present invention is industrially applicable to the bending meshing type gear device.

It should be understood that the invention is not limited to the above-described embodiment, but may be modified into various forms on the basis of the spirit of the invention. Additionally, the modifications are included in the scope of the invention.

What is claimed is:

1. A bending meshing type gear device comprising:
a wave generator;
an external gear flexibly deformed by the wave generator; and
an internal gear meshing with the external gear,
wherein the internal gear includes
an internal tooth ring portion including an internal tooth formed on an inner periphery,
an external connection portion,
a deformable portion provided between the internal tooth ring portion and the external connection portion, and configured to be more deformable than the internal tooth ring portion, and
a distortion measurer provided in the deformable portion.

2. The bending meshing type gear device according to claim 1,
wherein the deformable portion is configured to include a plurality of pillar members intermittently provided in a circumferential direction between the internal tooth ring portion and the external connection portion.

3. The bending meshing type gear device according to claim 2, further comprising:
a support member provided between the pillar members to suppress deformation of the internal tooth ring portion.

4. The bending meshing type gear device according to claim 3,
wherein the support member is separated from the internal tooth ring portion and the external connection portion, and is fixed to the internal tooth ring portion or the external connection portion in the circumferential direction.

5. The bending meshing type gear device according to claim 2,
wherein the pillar members are extended in a radial direction, and
the deformable portion includes a plurality of bearing portions that connect the internal tooth ring portion and the external connection portion in the radial direction and the circumferential direction.

6. The bending meshing type gear device according to claim 5,
wherein each of the plurality of bearing portions includes a first extending portion extending outward in the radial direction from an outer periphery of the internal tooth ring portion, a second extending portion extending inward in the radial direction from an inner periphery of the external connection portion, and an intermediate connection portion connecting an extending end portion of the first extending portion and an extending end portion of the second extending portion.

7. The bending meshing type gear device according to claim 2,
wherein two of the plurality of pillar members are provided to face each other on both sides in a radial direction of the internal gear, and the distortion measurer is provided in only one of the two pillar members.

8. The bending meshing type gear device according to claim 2,
wherein an odd number of the pillar members are intermittently provided in the circumferential direction.

9. The bending meshing type gear device according to claim 2,
wherein the distortion measurer comprises one or more double shearing type distortion gauges each including individual measurement units corresponding to distortions in two directions.

10. The bending meshing type gear device according to claim 9,
wherein the one or more double sharing type distortion gauges comprise two or more double shearing type distortion gauges each provided in each of the plurality of pillar members respectively, and
a Wheatstone bridge circuit is provided in which the measurement units corresponding to one direction of the two or more double shearing type distortion gauges are connected in series, and are incorporated into one path, and the measurement units corresponding to the other direction of the two or more double shearing type distortion gauges are connected in series, and are incorporated into another path.

11. The bending meshing type gear device according to claim 10,
wherein the measurement units include grid portions in which resistance wires are folded back in parallel in multiple layers, and leads extending from both end portions of the grid portions.

12. The bending meshing type gear device according to claim 9,
wherein the one or more double sharing type distortion gauges comprise two or more double shearing type distortion gauges each provided in each of the plurality of pillar members respectively,
a Wheatstone bridge circuit is provided in which the measurement units corresponding to one direction of the two or more double shearing type distortion gauges are connected in series, and are incorporated into one path, and
another Wheatstone bridge circuit is provided in which the measurement units corresponding to the other direction of the two or more double shearing type distortion gauges are connected in series, and are incorporated into another path.

13. The bending meshing type gear device according to claim 1,
wherein the deformable portion has a smaller thickness in an axial direction than the internal tooth ring portion.

14. The bending meshing type gear device according to claim 1,
wherein the deformable portion is configured to be more deformable than the external connection portion.

15. The bending meshing type gear device according to claim 1, further comprising:
a wave generator bearing disposed between the wave generator and a base portion on which the external gear is formed.

16. The bending meshing type gear device according to claim 15,
wherein the wave generator bearing includes an outer ring fitted into the base portion, a plurality of rolling elements, and a holder that holds the plurality of rolling elements.

17. The bending meshing type gear device according to claim 1,
wherein the deformable portions are provided on one end side and the other end side in a radial direction of the internal gear, and
the distortion measurer is provided in the deformable portion on the one end side, but is not provided in the deformable portion on the other end side.

18. The bending meshing type gear device according to claim 17,
wherein the wave generator has an elliptical outer shape in a cross-section perpendicular to an axial direction.

19. The bending meshing type gear device according to claim 1,
wherein the external connection portion includes a plurality of attachment holes which penetrate in an axial direction.

20. The bending meshing type gear device according to claim 1,
wherein the external connection portion is connected to a cover.

* * * * *